(12) United States Patent
Peng et al.

(10) Patent No.: US 11,783,454 B2
(45) Date of Patent: Oct. 10, 2023

(54) SALIENCY MAP GENERATION METHOD AND IMAGE PROCESSING SYSTEM USING THE SAME

(71) Applicant: National Chengchi University, Taipei (TW)

(72) Inventors: Yan-Tsung Peng, Taipei (TW); Yu-Cheng Lin, Taipei (TW)

(73) Assignee: National Chengchi University, Taipei (TW)

( * ) Notice: Subject to any disclaimer, the term of this patent is extended or adjusted under 35 U.S.C. 154(b) by 173 days.

(21) Appl. No.: 17/406,099

(22) Filed: Aug. 19, 2021

(65) Prior Publication Data
US 2022/0156889 A1    May 19, 2022

(30) Foreign Application Priority Data
Nov. 16, 2020   (TW) .................................. 109139873

(51) Int. Cl.
*G06T 5/00*    (2006.01)
*G06T 5/20*    (2006.01)
*G06T 3/40*    (2006.01)
*G06V 10/46*   (2022.01)
(Continued)

(52) U.S. Cl.
CPC ............ *G06T 5/002* (2013.01); *G06F 18/213* (2023.01); *G06F 18/253* (2023.01); *G06T 3/4053* (2013.01); *G06T 5/20* (2013.01); *G06V 10/462* (2022.01); *G06T 2207/20024* (2013.01)

(58) Field of Classification Search
CPC ......... G06T 5/002; G06T 3/4053; G06T 5/20; G06T 2207/20024; G06T 2207/20081; G06T 2207/20084; G06T 7/11; G06T 7/194; G06F 18/213; G06F 18/253;
(Continued)

(56) References Cited

U.S. PATENT DOCUMENTS

| 10,839,543 B2 * | 11/2020 | Cheng .................. G06V 10/454 |
| 2018/0231871 A1 * | 8/2018 | Wang ..................... G03B 13/30 |
| 2019/0213481 A1 * | 7/2019 | Godard ..................... G06T 7/50 |

(Continued)

FOREIGN PATENT DOCUMENTS

| CN | 104052967 | 9/2014 |
| CN | 111209952 | 5/2020 |
| TW | 202002772 | 1/2020 |

OTHER PUBLICATIONS

Hashisho et al, Underwater Color Restoration Using U-Net Denoising Autoencoder, 2019 11th International Symposium on Image and Signal Processing and Analysis (ISPA) Dubrovnik, Croatia (Year: 2019).*

(Continued)

*Primary Examiner* — Andrae S Allison
(74) *Attorney, Agent, or Firm* — JCIPRNET

(57) ABSTRACT

A saliency map generation method and an image processing system using the same are provided. The method includes the following steps. An original underwater image is received. A blurring processing is performed on the original underwater image to generate a defocus map. The defocus map is input to an auxiliary convolutional network model to obtain multiple feature maps of the defocus map. The original underwater image and the feature maps are input to a main convolutional network model to generate a saliency map of the original underwater image.

16 Claims, 6 Drawing Sheets

(51) Int. Cl.
*G06F 18/213* (2023.01)
*G06F 18/25* (2023.01)
(58) Field of Classification Search
CPC ...... G06V 10/462; G06V 10/25; G06V 10/26; G06V 10/82
See application file for complete search history.

(56) References Cited

U.S. PATENT DOCUMENTS

| | | | |
|---|---|---|---|
| 2020/0050893 A1 | 2/2020 | Suresh et al. | |
| 2020/0273192 A1* | 8/2020 | Cheng | G06V 10/82 |
| 2022/0004808 A1* | 1/2022 | Yuan | G06V 10/26 |
| 2022/0351386 A1* | 11/2022 | Tang | G06F 18/213 |

OTHER PUBLICATIONS

Zhang, He, Vishwanath Sindagi, and Vishal M. Patel. "Joint transmission map estimation and dehazing using deep networks." IEEE Transactions on Circuits and Systems for Video Technology 30.7 (2019): 1975-1986. (Year: 2019).*

Cao, Keming, Yan-Tsung Peng, and Pamela C. Cosman. "Underwater image restoration using deep networks to estimate background light and scene depth." 2018 IEEE Southwest Symposium on Image Analysis and Interpretation (SSIAI). IEEE, 2018. (Year: 2018).*

Babu et al, Underwater Image Restoration using Scene Depth Estimation Technique, Proceedings of the Third International Conference on Smart Systems and Inventive Technology (ICSSIT 2020) IEEE Xplore Part No. CFP20P17-ART; ISBN: 978-1-7281-5821-1 (Year: 2020).*

Liu, Jun, et al. "A scale-adaptive matching algorithm for underwater acoustic and optical images." Sensors 20.15 (Jul. 29, 2020): 4226. (Year: 2020).*

Tengyue Li, Shenghui Rong, Xueting Cao, Yongbin Liu, Long Chen, Bo He, "Underwater image enhancement framework and its application on an autonomous underwater vehicle platform," Opt. Eng. 59(8) 083102 (Aug. 10, 2020) https://doi.org/10.1117/1.OE.59.8.083102 (Year: 2020).*

Peng, Yan-Tsung et al., "Underwater Image Restoration Based on Image Blurriness and Light Absorption.", IEEE transactions on image processing, Feb. 2, 2017, pp. 1-17.

Yan-Tsung Peng et al., "Single Underwater Image Enhancement Using Depth Estimation Based on Blurriness", 2015 IEEE International Conference on Image Processing (ICIP), Sep. 27, 2015, pp. 1-5.

Keming Cao et al, "Underwater Image Restoration using Deep Networks to Estimate Background Light and Scene Depth", 2018 IEEE Southwest Symposium on Image Analysis and Interpretation (SSIAI), Apr. 8, 2018, pp. 1-4.

"Office Action of Taiwan Counterpart Application", dated Sep. 7, 2021, p. 1-p. 10.

Xiaolin Xiao et al., "RGB-'D' Saliency Detection With Pseudo Depth", IEEE Transactions on Image Processing, vol. 28, No. 5, May 2019, pp. 2126-2139.

Jia-Xing Zhao et al., "EGNet: Edge Guidance Network for Salient Object Detection", 2019 IEEE/CVF International Conference on Computer Vision (ICCV), Aug. 2019, pp. 8779-8788.

Xuebin Qin et al., "BASNet: Boundary-Aware Salient Object Detection", Proceedings of the IEEE/CVF Conference on Computer Vision and Pattern Recognition (CVPR), Jun. 16-20, 2019, pp. 7479-7489.

* cited by examiner

SALIENCY MAP GENERATION METHOD AND IMAGE PROCESSING SYSTEM USING THE SAME

CROSS-REFERENCE TO RELATED APPLICATION

This application claims the priority benefit of Taiwan application serial no. 109139873, filed on Nov. 16, 2020. The entirety of the above-mentioned patent application is hereby incorporated by reference herein and made a part of this specification.

BACKGROUND

Technical Field

The disclosure relates to an image processing technology, and more particularly to a saliency map generation method and an image processing system using the same.

Description of Related Art

Salient object detection (SOD) is an important topic of research in computer vision, finding the most salient object in an image based on human visual attention mechanism. Current research in this field has made substantial progress due to the rapid development of deep learning technologies. However, predictions made by major test datasets and models are based on good and clear image quality. Therefore, even the latest research has failed to generate good prediction results for images taken in harsh environments, especially images taken underwater, where scattering and absorption caused by transmission of light in different media may lead to serious deviations of image color and contrast.

Generally speaking, image enhancement or image restoration methods are usually used for image preprocessing when processing images with poor quality such as underwater images. Image enhancement is for enhancing image contrast, but enhanced regions are probably not salient target objects, resulting in a negative impact on accuracy of salient object detection models. Image restoration is to design a restoration model of reverse restoration based on a hypothetical degradation model, but features useful for salient object detection may be lost as restoration is performed by the restoration model designed without prior knowledge.

SUMMARY

In view of the above, the disclosure provides a saliency map generation method and an image processing system using the same, which may generate an accurate saliency map for underwater images.

The embodiments of the disclosure provide a saliency map generation method, including the following steps. An original underwater image is received. A blurring process is performed on the original underwater image to generate a defocus map. The defocus map is input to an auxiliary convolutional network model to obtain multiple first feature maps of the defocus map. The original underwater image and the first feature maps are input to a main convolutional network model to generate a saliency map of the original underwater image.

The embodiments of the disclosure provide an image processing system, including a storage circuit and a processor. The processor is coupled to the storage circuit and is configured to perform the following steps. An original underwater image is received. A blurring process is performed on the original underwater image to generate a defocus map. The defocus map is input to an auxiliary convolutional network model to obtain multiple first feature maps of the defocus map. The original underwater image and the first feature maps are input to a main convolutional network model to generate a saliency map of the original underwater image.

Based on the above, in the embodiments of the disclosure, the defocus map of the original underwater image may be generated, and the first feature maps generated by the defocus map through convolution operations may be provided to the main convolutional network model. In light of this, the main convolutional network model may generate the saliency map of good quality for the original underwater image based on the first feature maps of the defocus map and the original underwater image, so as to improve accuracy of salient object detection.

In order to make the aforementioned features and advantages of the disclosure comprehensible, embodiments accompanied with drawings are described in detail below.

DESCRIPTION OF THE EMBODIMENTS

Figure 1:
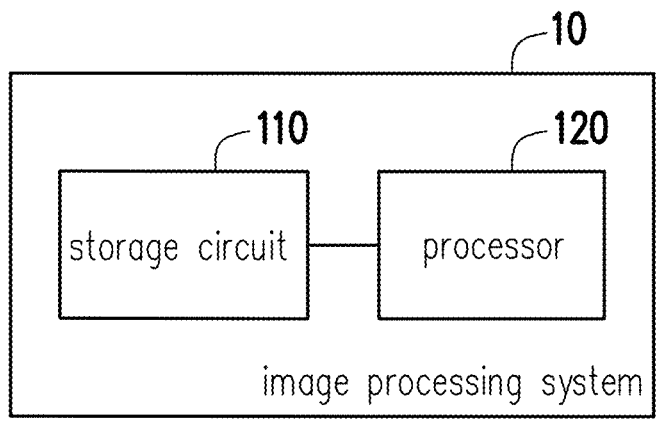
FIG. 1 is a schematic diagram of an image processing system according to an embodiment of the disclosure.

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure. More precisely, these embodiments only serve as examples of the method and system within the scope of the claims of the disclosure.

FIG. 1 is a schematic diagram of an image processing system according to an embodiment of the disclosure. An image processing system 10 includes a storage circuit 110 and a processor 120.

The storage circuit 110 is used to store data and program codes such as an operating system, an application program, a driving program, or other data accessible by the processor 120, and the storage circuit 110 may be, for example, any type of fixed or mobile random access memory (RAM), read-only memory (ROM), flash memory, or a combination thereof.

The processor 120 is coupled to the storage circuit 110, and the processor 120 may be a central processing unit (CPU), an application processor (AP), or other programmable general-purpose or special-purpose microprocessor, a digital signal processor (DSP), an image signal processor (ISP), a graphics processing unit (GPU), or other similar apparatuses, integrated circuits, and a combination thereof. The processor 120 may access and execute the program codes and software elements recorded in the storage circuit 110 to implement an image quality improvement method in the embodiments of the disclosure.

In this embodiment, the storage circuit 110 of the image processing system 10 stores multiple program code fragments, and the program code fragments are executed by the processor 120 after installed. For example, the storage circuit 110 records multiple modules, and each operation applied to the image processing system 10 is performed by these modules. Each of the modules is composed of one or more program code fragments. However, the disclosure is not limited thereto, and each operation of the image processing system 10 may also be implemented in other hardware forms.

Figure 2:
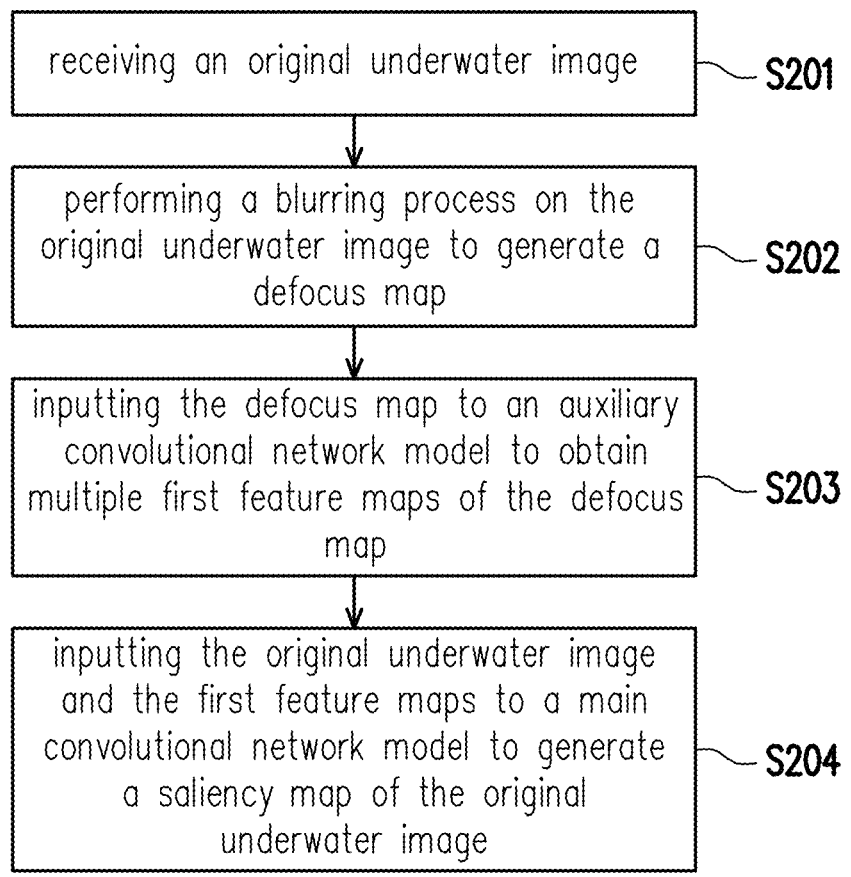
FIG. 2 is a flowchart of a saliency map generation method according to an embodiment of the disclosure.
Figure 3:
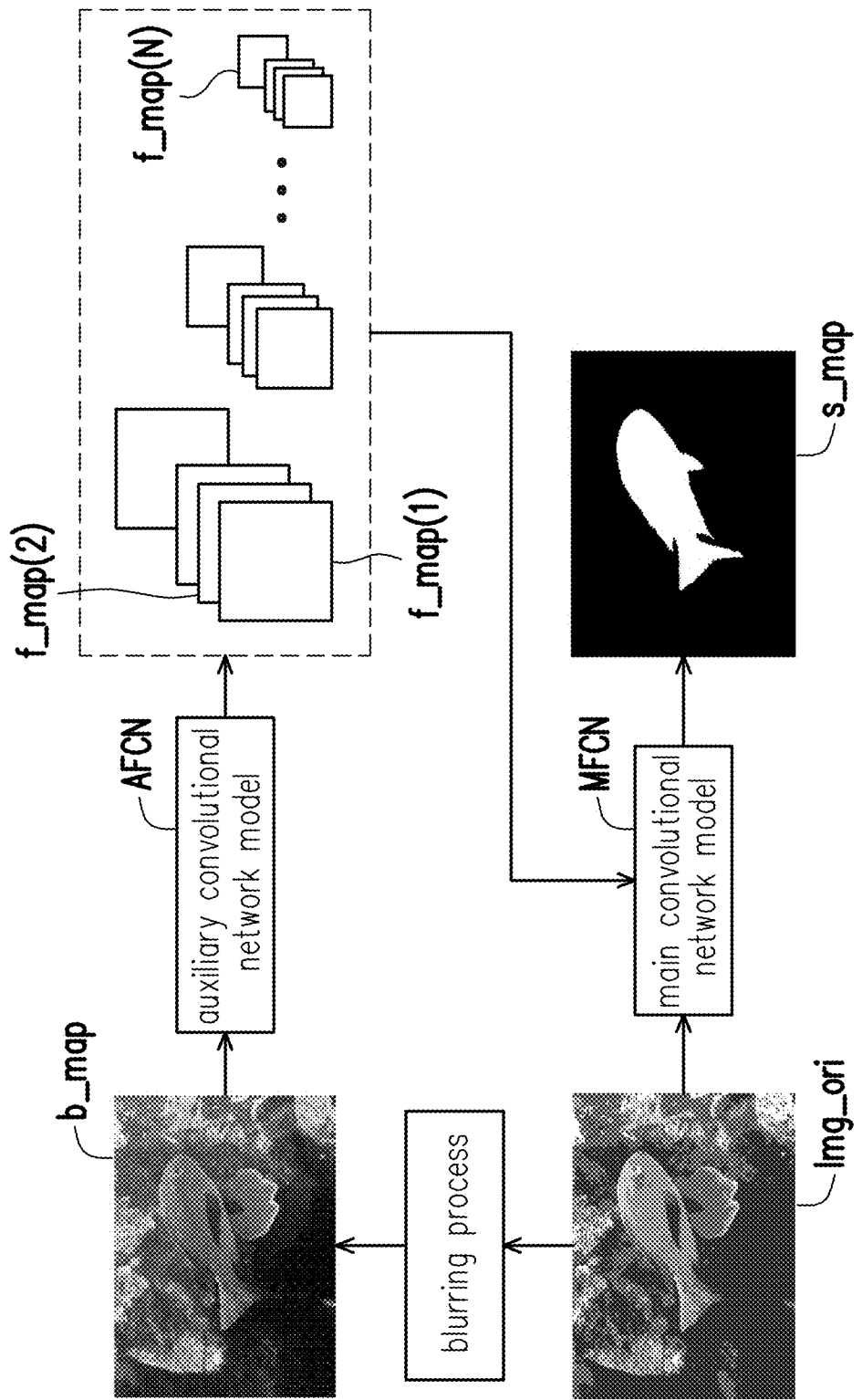
FIG. 3 is a schematic diagram of a saliency map generation method according to an embodiment of the disclosure.

FIG. 2 is a flowchart of a saliency map generation method according to an embodiment of the disclosure. FIG. 3 is a schematic diagram of a saliency map generation method according to an embodiment of the disclosure. With reference to FIG. 1, FIG. 2, and FIG. 3, the method of this embodiment is adapted for the image processing system 10 in the above embodiment. Detailed steps of the saliency map generation method in this embodiment are described as follows with reference to elements in the image processing system 10.

In step S201, the processor 120 receives an original underwater image Img_ori. The original underwater image Img_ori is an image generated by an image capture apparatus shooting underwater scenes. In some embodiments, the original underwater image Img_ori may be an RGB image, meaning that each pixel in the original underwater image Img_ori has a red channel value, a green channel value, and a blue channel value. Since the original underwater image Img_ori is shot underwater, the original underwater image Img_ori may have poor contrast, low brightness, color shift and distortion, or low visibility, etc.

In step S202, the processor 120 performs a blurring process on the original underwater image Img_ori to generate a defocus map b_map. This defocus map b_map may also be referred to as a blurriness map. Generally speaking, the farther underwater objects in the original underwater image Img_ori are away from the image capture apparatus, the more blurred the underwater objects are. Therefore, in some embodiments, the processor 120 may estimate depth information according to blurriness information in the original underwater image Img_ori. In light of this, the defocus map b_map has the depth information. In addition, since salient objects in underwater scenes are generally focus subjects of the image capture apparatus, the salient objects are clearer than their surrounding scene objects. In other words, compared with the surrounding scene objects of the salient objects, the salient objects in the original underwater image Img_ori has lower blurriness. Based on this, in some embodiments, the processor 120 may subsequently enhance accuracy of detecting salient objects in underwater scenes according to information provided by the defocus map b_map.

In some embodiments, the processor 120 may use multiple Gaussian filters respectively corresponding to multiple scales to perform a filtering processing on the original underwater image Img_ori to obtain the defocus map b_map. In detail, the processor 120 may use multiple Gaussian filter masks corresponding to different mask scales to perform the filtering processing on the original underwater image Img_ori to obtain multiple blurred images. In an embodiment, the processor 120 may use a k×k Gaussian filter mask to perform the filtering processing, where k=$2^i$+1 and 1≤i≤n. For example, assuming that n=4, the mask scales may be 3×3, 5×5, 9×9, or 17×17, but the disclosure is not limited thereto. The processor 120 may calculate absolute pixel differences between each pixel position in each of the blurred images and each corresponding pixel position in the original underwater image Img_ori. Therefore, the processor 120 may obtain the defocus map b_map by calculating an average value of multiple absolute pixel differences corresponding to each pixel position.

In some embodiments, the processor 120 may further execute a morphological image processing and/or use a guided filter to perform the filtering processing to optimize the defocus map b_map. In detail, in an embodiment, the processor 120 may execute expansion operations in the morphological image processing to fill holes in the defocus map b_map. In an embodiment, the processor 120 may use the guided filter to perform the filtering processing on the defocus map b_map to perform a soft matting processing on the optimized defocus map b_map.

In step S203, the processor 120 inputs the defocus map b_map to an auxiliary convolutional network model AFCN to obtain multiple first feature maps f_map(1) to f_map(N) of the defocus map b_map. Multiple convolutional layers of the auxiliary convolutional network model AFCN may generate the first feature maps f_map(1) to f_map(N) of the defocus map b_map. In some embodiments, the auxiliary convolutional network model AFCN includes multiple convolutional layers and multiple pooling layers. Each convolutional layer in the auxiliary convolutional network model AFCN uses one or more convolution kernels for convolution operations to output one or more feature maps. The number of the feature maps output by each convolutional layer in the auxiliary convolutional network model AFCN depends on the number of the convolution kernels used by each convolutional layer. It should be noted that in some embodiments, the first feature maps f_map(1) to f_map(N) may be the feature maps output by all or part of the convolutional layers in the auxiliary convolutional network model AFCN.

In some embodiments, the pooling layers of the auxiliary convolutional network model AFCN are used to perform pooling operations on part of the feature maps to allow the auxiliary convolutional network model AFCN to output the first feature maps f_map(1) to f_map (N) corresponding to multiple specific types of resolution. The pooling operations are, for example but not limited to, maximum pooling operations. For example, as shown in the example of FIG. 3, the resolution of the first feature map f_map(1) is the same as the resolution of the first feature map f_map(2), but the resolution of the first feature map f_map(1) is different from the resolution of the first feature map f_map (N).

Figure 4:
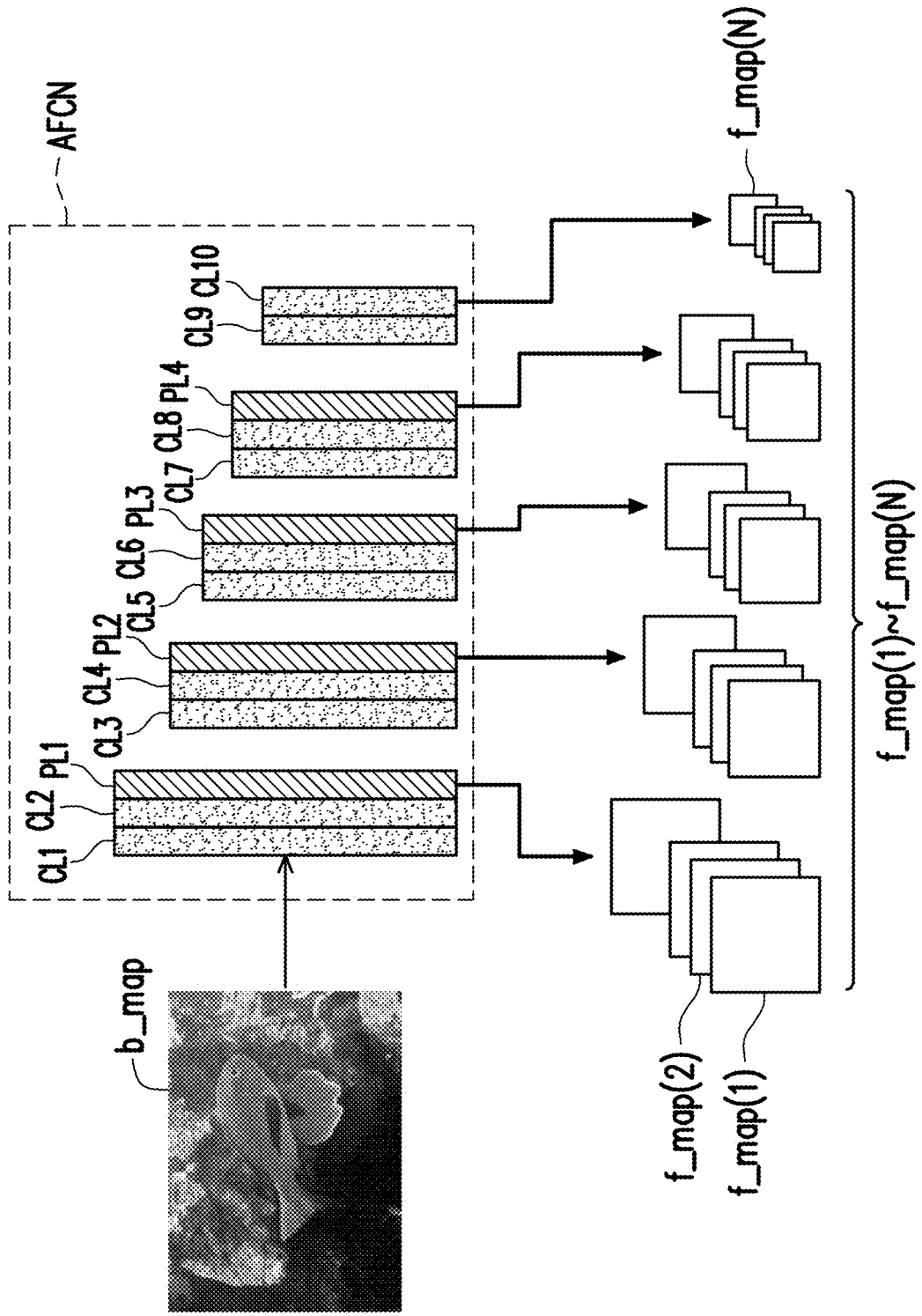
FIG. 4 is a schematic diagram of an auxiliary convolutional network model according to an embodiment of the disclosure.

With reference to FIG. 4, FIG. 4 is a schematic diagram of an auxiliary convolutional network model according to an embodiment of the disclosure. In this embodiment, the auxiliary convolutional network model AFCN may include 10 convolutional layers CL1 to CL10 and 4 pooling layers PL1 to PL4. The output of the convolutional layer CL1 is fed to the convolutional layer CL2, the output of the convolutional layer CL2 is fed to the pooling layer PL1, the output of the pooling layer PL1 is fed to the convolutional layer CL3, and so on. The convolutional layers CL1 and CL2 may output feature maps having first resolution. The convolutional layers CL3 and CL4 may output feature maps having second resolution. The convolutional layers CL5 and CL6 may output feature maps having third resolution. The convolutional layers CL7 and CL8 may output feature maps having fourth resolution. The convolutional layers CL9 and CL10 may output feature maps having fifth resolution. In this embodiment, the feature maps generated by the convolutional layers CL2, CL4, CL6, CL8, and CL10 are the first feature maps f_map(1) to f_map(N) that are input to a main convolutional network model MFCN and are corresponding to of five different resolution. In addition, the pooling layers PL1 to PL4 may respectively perform maximum pooling operations on the feature maps generated by the convolutional layers CL2, CL4, CL6, CL8, and CL10 to reduce the resolution. It should be noted that FIG. 4 is only an exemplary implementation, and the number and configuration of the convolutional layers and the pooling layers in the auxiliary convolutional network model AFCN may be set according to actual requirements.

In step S204, the processor 120 inputs the original underwater image Img_ori and the first feature maps f_map(1) to f_map(N) to the main convolutional network model MFCN to generate a saliency map s_map of the original underwater image Img_ori. In other words, the main convolutional network model MFCN may generate the saliency map s_map of the original underwater image Img_ori according to the original underwater image Img_ori and the first feature maps f_map(1) to f_map(N). As mentioned above, since blurriness information in the defocus map b_map may help salient object detection in underwater scenes, the accuracy of the saliency map s_map may be improved if the main convolutional network model MFCN estimates the saliency map s_map of the original underwater image Img_ori according to feature information of the defocus map b_map (i.e., the first feature maps f_map(1) to f_map(N)).

In some embodiments, the processor 120 may perform a feature fusion processing on the first feature maps f_map(1) to f_map(N) and multiple second feature maps generated by multiple convolutional layers of the main convolutional network model MFCN to generate multiple fusion feature maps. The feature fusion processing is used to fuse one of the first feature maps f_map(1) to f_map(N) and one of the second feature maps with the same resolution correspondingly. In other words, the processor 120 may perform the feature fusion processing on one first feature map and one second feature map that have the same resolution. In addition, the processor 120 may input these fusion feature maps to the convolutional layers of the main convolutional network model MFCN.

Figure 5:
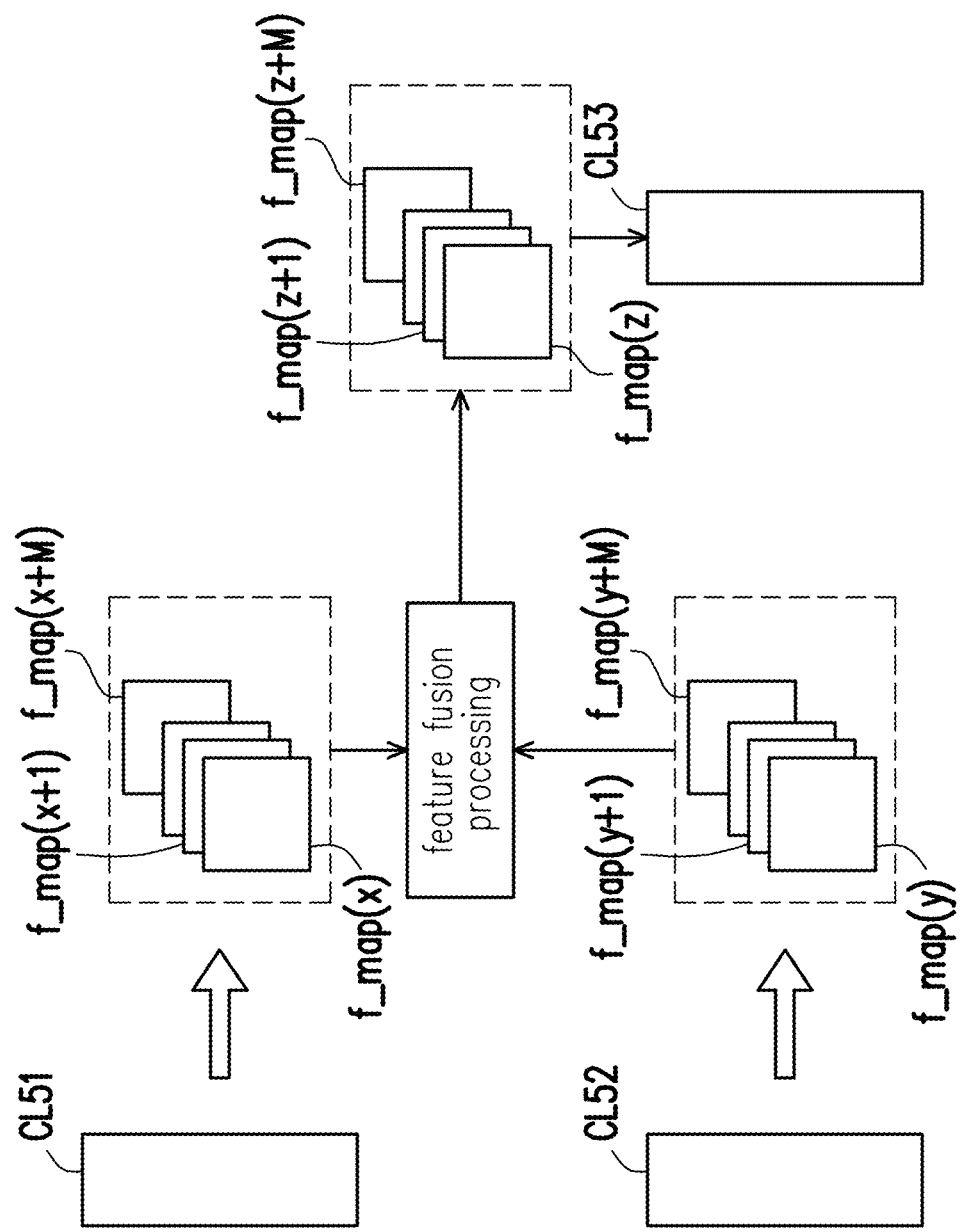
FIG. 5 is a schematic diagram of fusing first feature maps and second feature maps according to an embodiment of the disclosure.

With reference to FIG. 5, FIG. 5 is a schematic diagram of fusing first feature maps and second feature maps according to an embodiment of the disclosure. In order to clearly describe the embodiment, FIG. 5 only takes a first feature map generated by a certain convolutional layer of the auxiliary convolutional network model AFCN and a second feature map generated by a certain convolutional layer of the main convolutional network model MFCN as an example for description. A convolutional layer CL51 of the auxiliary convolutional network model AFCN (which may be, for example, any one of CL2, CL4, CL6, CL8, or CL10 shown in FIG. 4) may generate multiple first feature maps f_map(x) to f_map(x+M). A convolutional layer CL52 of the main convolutional network model MFCN may generate multiple second feature maps f_map(y) to f_map(y+M). The processor 120 may perform the feature fusion processing on the first feature maps f_map(x) to f_map(x+M) and the second feature maps f_map(y) to f_map(y+M) to generate multiple fusion feature maps f_map(z) to f_map(z+M). It should be noted that the first feature maps f_map(x) to f_map(x+M) are of the same resolution as the second feature maps f_map(y) to f_map(y+M). In detail, the processor 120 may perform the feature fusion processing on the first feature map f_map(x) and the second feature map f_map(y) to generate the fusion feature map f_map(z), the processor 120 may perform the feature fusion processing on a first feature map f_map(x+1) and a second feature map f_map(y+1) to generate a fusion feature map f_map(z+1), and so on. In other words, the processor 120 may perform the feature fusion processing on each of the first feature maps f_map(x) to f_map(x+M) and the corresponding one of the second feature maps f_map(y) to f_map(y+M). It should be noted that the fusion feature maps f_map(z) to f_map(z+M) may be fed to a convolutional layer CL53 in a next layer of the main convolutional network model MFCN for convolution operations.

In some embodiments, the feature fusion processing is used to add each feature value of one of multiple first feature maps and each feature value of one of multiple second feature maps. In other words, the processor 120 may perform element-wise addition on the feature values of each first feature map and the feature values of the corresponding second feature map. As exemplified in FIG. 5 for description, the processor 120 may add each feature value in the first feature map f_map(x) and the corresponding feature value in the second feature map f_map(y) to generate each feature value in the fusion feature map f_map(z). However, in other embodiments, apart from element-wise addition, the processor 120 may also use other feature fusion techniques to fuse the feature values of the first feature maps and the corresponding feature values of the second feature maps.

Based on the description of FIG. 3 and FIG. 5, the processor 120 may perform the feature fusion processing on the first feature maps f_map(1) to f_map(N) output by the convolutional layers of the auxiliary convolutional network model AFCN and the second feature maps output by the corresponding convolutional layers of the main convolutional network model MFCN. In this way, when the feature information of the defocus map b_map is introduced to the main convolutional network model MFCN, the main convolutional network model MFCN may estimate the accurate saliency map s_map according to the original underwater image Img_ori.

In addition, the processor 120 adds a loss layer to the main convolutional network model MFCN during training, and the loss layer may calculate loss values according to corresponding loss functions. The processor 120 may determine whether the auxiliary convolutional network model AFCN and the main convolutional network model MFCN complete learning according to the loss values. In addition, the processor 120 may adjust weight data in the auxiliary convolutional network model AFCN and the main convolutional network model MFCN one by one from back to front by backpropagation according to the loss values. In an embodiment, the loss layer is only used during training. The loss layer may be removed when training is completed.

It should be noted that the network architecture of the main convolutional network model MFCN may be set according to actual requirements. In an embodiment, the main convolutional network model MFCN may include a U-net model. Specifically, the main convolutional network model MFCN may be implemented as a U-net model including a downsampling network part (also referred to as an encoder) and an upsampling network part (also referred to as a decoder). In an embodiment, for related details of using the U-net model, reference may be made to related technical literature, such as "O. Ronneberger, P. Fischer, and T. Brox, *U-net: Convolutional networks for biomedical image segmentation*, in International Conference on Medical Image Computing and Computer-Assisted Intervention, 2015". In other words, the U-net model may have an encoder layer and a decoder layer of the same size having a connection therebetween. In an embodiment, the processor 120 may perform the feature fusion processing on multiple first feature maps output by the auxiliary convolutional network model AFCN and multiple second feature maps output by the downsampling network part of the main convolutional network model MFCN, and the fusion feature maps are input to multiple convolutional layers in the downsampling network part of the main convolutional network model MFCN. Or, in an embodiment, the processor 120 may perform the feature fusion processing on multiple first feature maps output by the auxiliary convolutional network model AFCN and multiple second feature maps output by the upsampling network part of the main convolutional network model MFCN, and the fusion feature maps are input to multiple convolutional layers in the upsampling network part of the main convolutional network model MFCN. Embodiments are provided below for description.

Figure 6A:
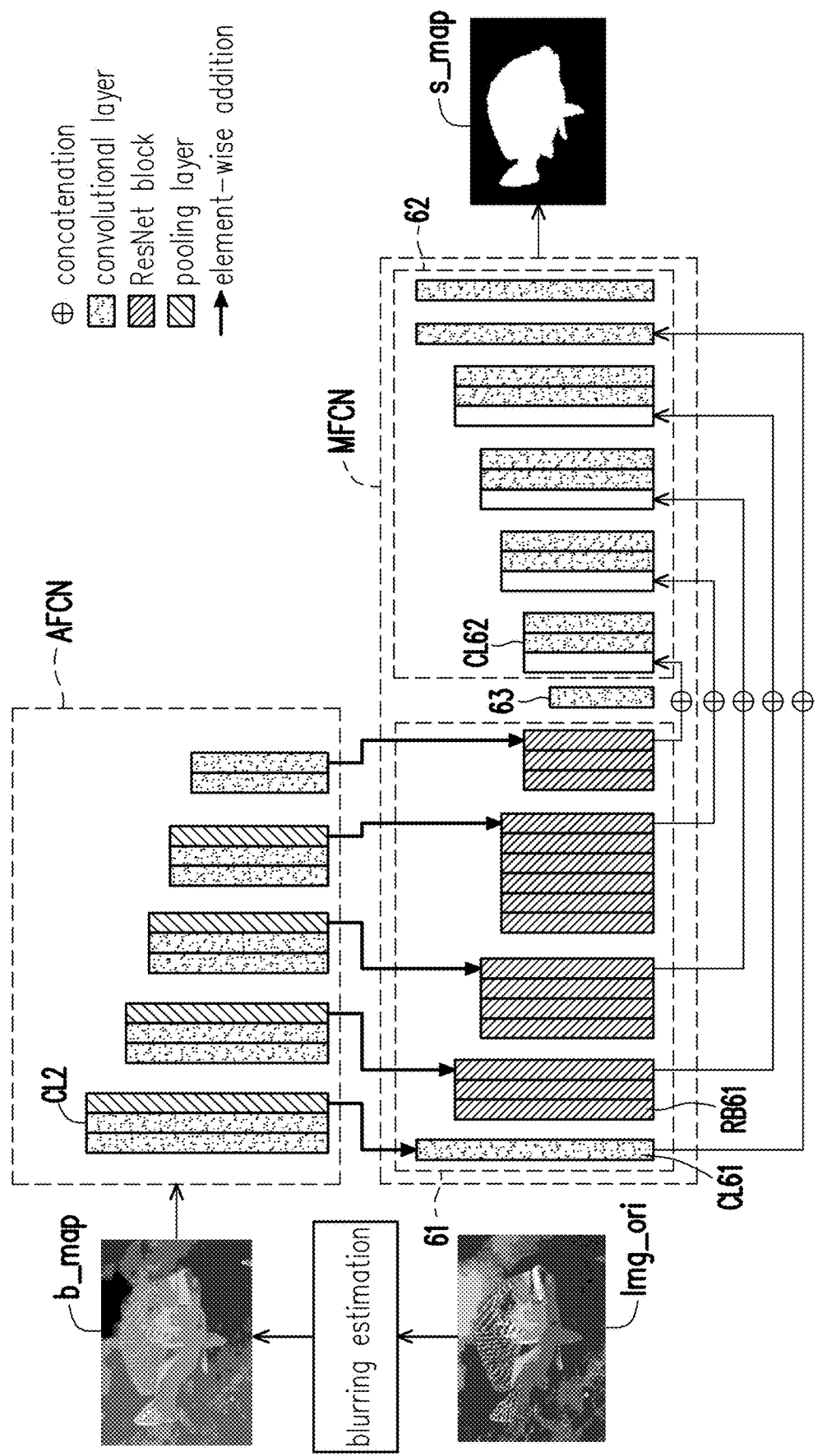
FIG. 6A is a schematic diagram of a main convolutional network model as a U-net model according to an embodiment of the disclosure.

With reference to FIG. 6A, FIG. 6A is a schematic diagram of a main convolutional network model as a U-net model according to an embodiment of the disclosure. In the embodiment of FIG. 6A, the processor 120 performs the feature fusion processing on multiple first feature maps output by the auxiliary convolutional network model AFCN and multiple second feature maps output by a downsampling network part of the main convolutional network model MFCN.

The main convolutional network model MFCN may include a downsampling network part 61, an upsampling network part 62, and a bridge layer 63. In this embodiment, the downsampling network part 61 may be implemented as a ResNet-50 network architecture. As shown in FIG. 6A, the downsampling network part 61 may include a convolutional layer CL61 and a ResNet block (for example, a ResNet block RB61) composed of multiple convolutional layers. Multiple residual blocks use a residual learning strategy to combine the output of previous layers with the output of subsequent layers. The bridge layer 63 is used to perform a convolution operation. Based on the characteristics of the U-net model, part of the feature maps generated in the downsampling network part 61 are spliced with part of the feature maps generated in the upsampling network part 62 through concatenation. The upsampling network part 62 includes multiple convolutional layers (for example, a convolutional layer CL62), and some convolutional layers of the upsampling network part 62 may perform upsampling through transposed convolution operations.

In this embodiment, the network architecture of the auxiliary convolutional network model AFCN is similar to the example shown in FIG. 4, and the same contents will not be repeated in the following. It should be noted that feature fusion is performed on the first feature maps output by some convolutional layers of the auxiliary convolutional network model AFCN and the second feature maps generated by some convolutional layers of the downsampling network part 61 through element-wise addition, and feature fusion results (also referred to as fusion feature maps here) are fed to the corresponding convolutional layer in the next layer for convolution operations. For example, the feature fusion processing is performed on the first feature maps output by the convolutional layer CL2 of the auxiliary convolutional network model AFCN and the second feature maps generated by the convolutional layer CL61 of the downsampling network part 61, and the fusion feature maps generated by the feature fusion processing are fed to the convolutional layers in the ResNet block RB61. In this way, fusing the first feature maps of the defocus map b_map into the main convolutional network model MFCN may significantly improve the quality of the saliency map s_map generated by the main convolutional network model MFCN.

Figure 6B:
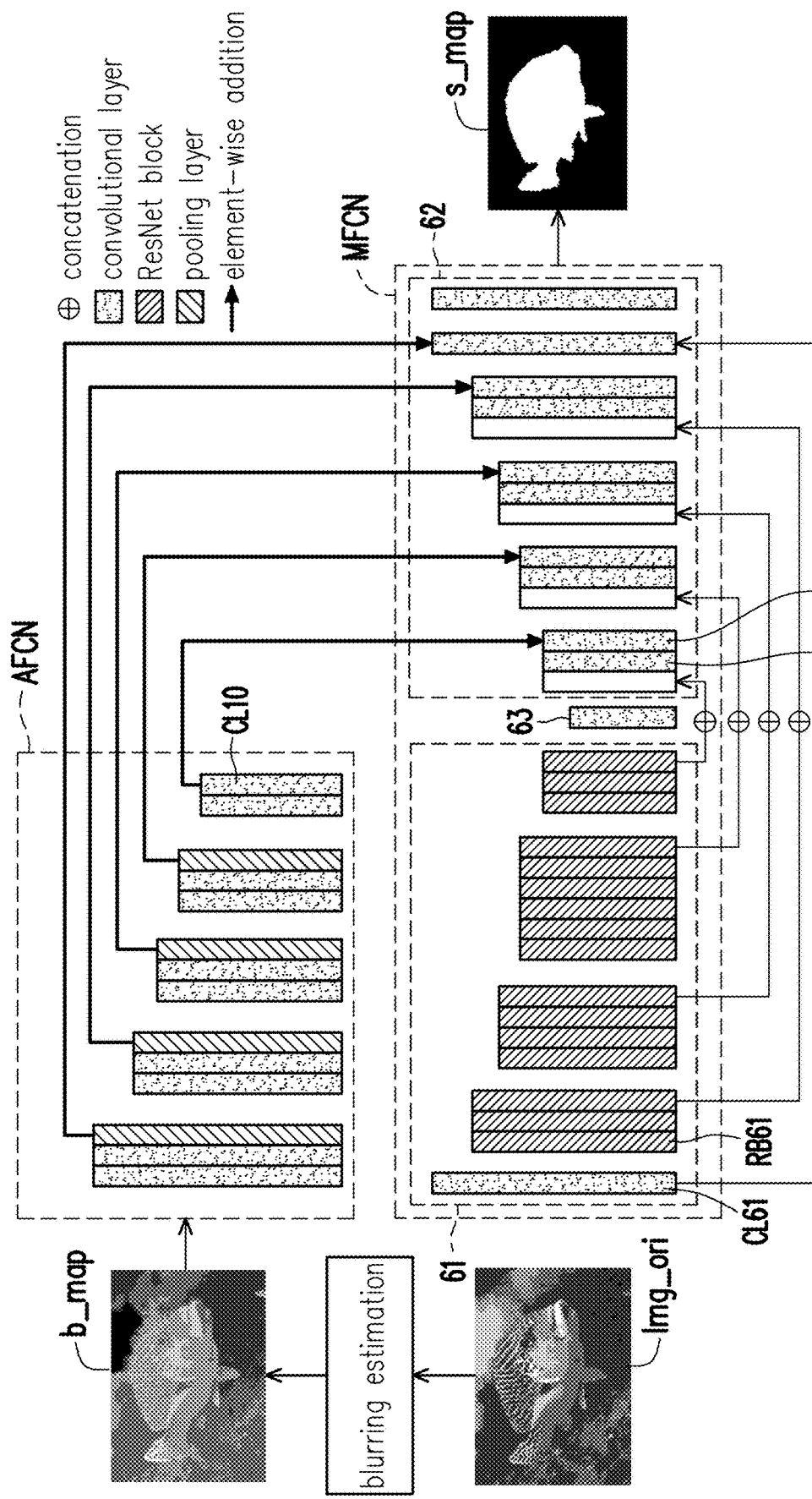
FIG. 6B is a schematic diagram of a main convolutional network model as a U-net model according to an embodiment of the disclosure.

In addition, with reference to FIG. 6B, FIG. 6B is a schematic diagram of a main convolutional network model as a U-net model according to an embodiment of the disclosure. In the embodiment of FIG. 6B, the processor 120 performs the feature fusion processing on multiple first feature maps output by the auxiliary convolutional network model AFCN and multiple second feature maps output by the upsampling network part of the main convolutional network model MFCN.

The network architecture of the main convolutional network model MFCN in the embodiment of FIG. 6B is similar to the example shown in FIG. 6A, and the same contents will not be repeated in the following. It should be noted that feature fusion is performed on the first feature maps output by some convolutional layers of the auxiliary convolutional network model AFCN and the second feature maps generated by some convolutional layers of the upsampling network part 62 through element-wise addition, and feature fusion results (also referred to as fusion feature maps here) are fed to the corresponding convolutional layer in a next layer for convolution operations. For example, the feature fusion processing is performed on the first feature maps output by the convolutional layer CL10 of the auxiliary convolutional network model AFCN and the second feature maps generated by the convolutional layer CL62 of the upsampling network part 61, and the fusion feature maps generated by the feature fusion processing are fed to a convolutional layer CL63 for transposed convolution operations. In this way, fusing the first feature maps of the defocus map b_map into the main convolutional network model MFCN may significantly improve the quality of the saliency map s_map generated by the main convolutional network model MFCN.

In summary, in the embodiments of the disclosure, the defocus map with blurriness information may be generated for the original underwater image, and the feature fusion processing may be performed on the feature maps generated by the defocus map through convolution operations and the feature maps generated by the convolution layers of the main convolutional network model. In this way, the main convolutional network model may use the feature information of the defocus map to estimate and generate a high-quality and accurate saliency map based on the original underwater image to improve accuracy of salient object detection in underwater scenes.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:
1. A saliency map generation method, comprising:
receiving an original underwater image;

performing a blurring process on the original underwater image by using a plurality of filters to generate a defocus map;

inputting the defocus map to an auxiliary convolutional network model to obtain a plurality of first feature maps of the defocus map; and inputting the original underwater image and the first feature maps of the defocus map to a main convolutional network model to generate a saliency map of the original underwater image.

2. The saliency map generation method according to claim 1, wherein a step of inputting the original underwater image and the first feature maps to the main convolutional network model to generate the saliency map of the original underwater image comprises:

performing a feature fusion processing on the first feature maps and a plurality of second feature maps generated by a plurality of convolutional layers of the main convolutional network model to generate a plurality of fusion feature maps.

3. The saliency map generation method according to claim 2, wherein the feature fusion processing is used to fuse one of the first feature maps and one of the second feature maps with same resolution correspondingly.

4. The saliency map generation method according to claim 2, wherein the feature fusion processing is used to add each feature value of one of the first feature maps and each feature value of one of the second feature maps.

5. The saliency map generation method according to claim 2, wherein the step of inputting the original underwater image and the first feature maps to the main convolutional network model to generate the saliency map of the original underwater image further comprises:

inputting the fusion feature maps to the convolutional layers of the main convolutional network model.

6. The saliency map generation method according to claim 2, wherein the main convolutional network model comprises a U-net model, the U-net model comprises a downsampling network part and an upsampling network part, and the fusion feature maps are input to the convolutional layers in the downsampling network part or the convolutional layers in the upsampling network part of the main convolutional network model.

7. The saliency map generation method according to claim 1, wherein a step of performing the blurring process on the original underwater image to generate the defocus map comprises:

performing a filtering processing on the original underwater image by a plurality of Gaussian filters respectively corresponding to a plurality of scales to obtain the defocus map; and executing a morphological image processing or using a guided filter to perform the filtering processing to optimize the defocus map.

8. The saliency map generation method according to claim 1, wherein the auxiliary convolutional network model comprises a plurality of convolutional layers and a plurality of pooling layers, and the convolutional layers of the auxiliary convolutional network model generate the first feature maps of the defocus map.

9. An image processing system, comprising:
a storage circuit;
a processor, coupled to the storage circuit and configured to:
receive an original underwater image;
perform a blurring process on the original underwater image by using a plurality of filters to generate a defocus map;
input the defocus map to an auxiliary convolutional network model to obtain a plurality of first feature maps of the defocus map; and
input the original underwater image and the first feature maps of the defocus map to a main convolutional network model to generate a saliency map of the original underwater image.

10. The image processing system according to claim 9, wherein the processor is further configured to: perform a feature fusion processing on the first feature maps and a plurality of second feature maps generated by a plurality of convolutional layers of the main convolutional network model to generate a plurality of fusion feature maps.

11. The image processing system according to claim 10, wherein the feature fusion processing is used to fuse one of the first feature maps and one of the second feature maps with same resolution correspondingly.

12. The image processing system according to claim 10, wherein the feature fusion processing is used to add each feature value of one of the first feature maps and each feature value of one of the second feature maps.

13. The image processing system according to claim 10, wherein the processor is further configured to: input the fusion feature maps to the convolutional layers of the main convolutional network model.

14. The image processing system according to claim 10, wherein the main convolutional network model comprises a U-net model, the U-net model comprises a downsampling network part and an upsampling network part, and the fusion feature maps are input to the convolutional layers in the downsampling network part or the convolutional layers in the upsampling network part of the main convolutional network model.

15. The image processing system according to claim 9, wherein the processor is further configured to: perform a filtering processing on the original underwater image by a plurality of Gaussian filters respectively corresponding to a plurality of scales to obtain the defocus map; and execute a morphological image processing or use a guided filter to perform the filtering processing to optimize the defocus map.

16. The image processing system according to claim 9, wherein the auxiliary convolutional network model comprises a plurality of convolutional layers and a plurality of pooling layers, and the convolutional layers of the auxiliary convolutional network model generate the first feature maps of the defocus map.

* * * * *